United States Patent
Seffernick et al.

(10) Patent No.: US 7,263,905 B2
(45) Date of Patent: Sep. 4, 2007

(54) REMOVABLE HALL-EFFECT SENSOR SYSTEM FOR STATOR WINDINGS IN A ROTATING ELECTRIC MACHINE

(75) Inventors: George H. Seffernick, Spring Grove, IL (US); Mahesh J. Shah, Lindenhurst, IL (US); James K. Kersting, Kenosha, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 11/047,335

(22) Filed: Jan. 28, 2005

(65) Prior Publication Data

US 2006/0169061 A1 Aug. 3, 2006

(51) Int. Cl.
*G01L 3/10* (2006.01)
(52) U.S. Cl. ............... 73/862.333; 73/862.331; 73/862.325; 73/862.321; 73/862.191; 73/862.08; 324/207.25; 324/207.2; 310/260
(58) Field of Classification Search ......... 73/862.331, 73/862.333, 862.325, 862.321, 862.08, 862; 324/207.25, 207.2; 310/260
See application file for complete search history.

(56) References Cited

U.S. PATENT DOCUMENTS

| | | | |
|---|---|---|---|
| 5,325,005 A * | 6/1994 | Denk | 310/68 B |
| 5,523,681 A * | 6/1996 | Hajzler et al. | 324/174 |
| 5,631,557 A * | 5/1997 | Davidson | 324/174 |
| 5,822,652 A * | 10/1998 | Elhatem et al. | 399/90 |
| 6,034,499 A * | 3/2000 | Tranovich | 318/650 |
| 6,354,162 B1* | 3/2002 | Bobay et al. | 73/866.5 |
| 2002/0153787 A1* | 10/2002 | Hollenbeck et al. | 310/68 R |
| 2003/0163924 A1* | 9/2003 | Hempe et al. | 30/388 |

OTHER PUBLICATIONS

Meyer (FR2655735), Patent Abstract, Published Jun. 14, 1991.*

* cited by examiner

*Primary Examiner*—Edward Lefkowitz
*Assistant Examiner*—Punam Patel
(74) *Attorney, Agent, or Firm*—Stephen G. Mican

(57) ABSTRACT

A Hall-Effect sensor assembly for a rotating electric machine comprises a thin, removable tubular substrate with Hall-Effect sensors and associated connection wiring mounted on it that slips underneath the wound stator end turns of the stator for the rotating electric machine to make the assembly easily removable for installation and repair.

15 Claims, 4 Drawing Sheets

REMOVABLE HALL-EFFECT SENSOR SYSTEM FOR STATOR WINDINGS IN A ROTATING ELECTRIC MACHINE

FIELD OF THE INVENTION

The invention relates to Hall-Effect sensor systems for rotating electric machines, and more particularly to a removable and repairable Hall-Effect sensor system for stator windings in rotating electric machines.

BACKGROUND OF THE INVENTION

Hall-Effect sensor systems are commonly installed in rotating electric machines, such as electric motors and generators. It is desirable to have such a Hall-Effect sensor system that is simple to install and remove for repair. This feature is critical in rotating electric machine designs that use the main rotor magnets to switch the Hall-Effect sensors. The Hall-Effect sensors must be located on the inside of the end turns of the stator next to the stator core. It is current practice to lace and impregnate the Hall-Effect sensors in place within the stator winding, thereby making the stator non-repairable.

SUMMARY OF THE INVENTION

The invention comprises a Hall-Effect sensor assembly for a rotating electric machine comprising a thin, removable tubular substrate with Hall-Effect sensors and associated connection wiring mounted on it. The assembly slips underneath the wound stator end turns of the stator for the rotating electric machine to make the assembly easily removable for installation and repair.

In a preferred embodiment, the invention comprises a removable Hall-Effect sensor system for a rotating electric machine, comprising: a thin tubular substrate to slidingly fit within an inner tubular surface of wound stator end turns for a stator in the rotating electric machine; and a plurality of Hall-Effect sensors mounted along a tubular surface of the substrate for detecting the position of a rotor in the rotating electric machine.

DETAILED DESCRIPTION OF THE INVENTION

Figure 1:
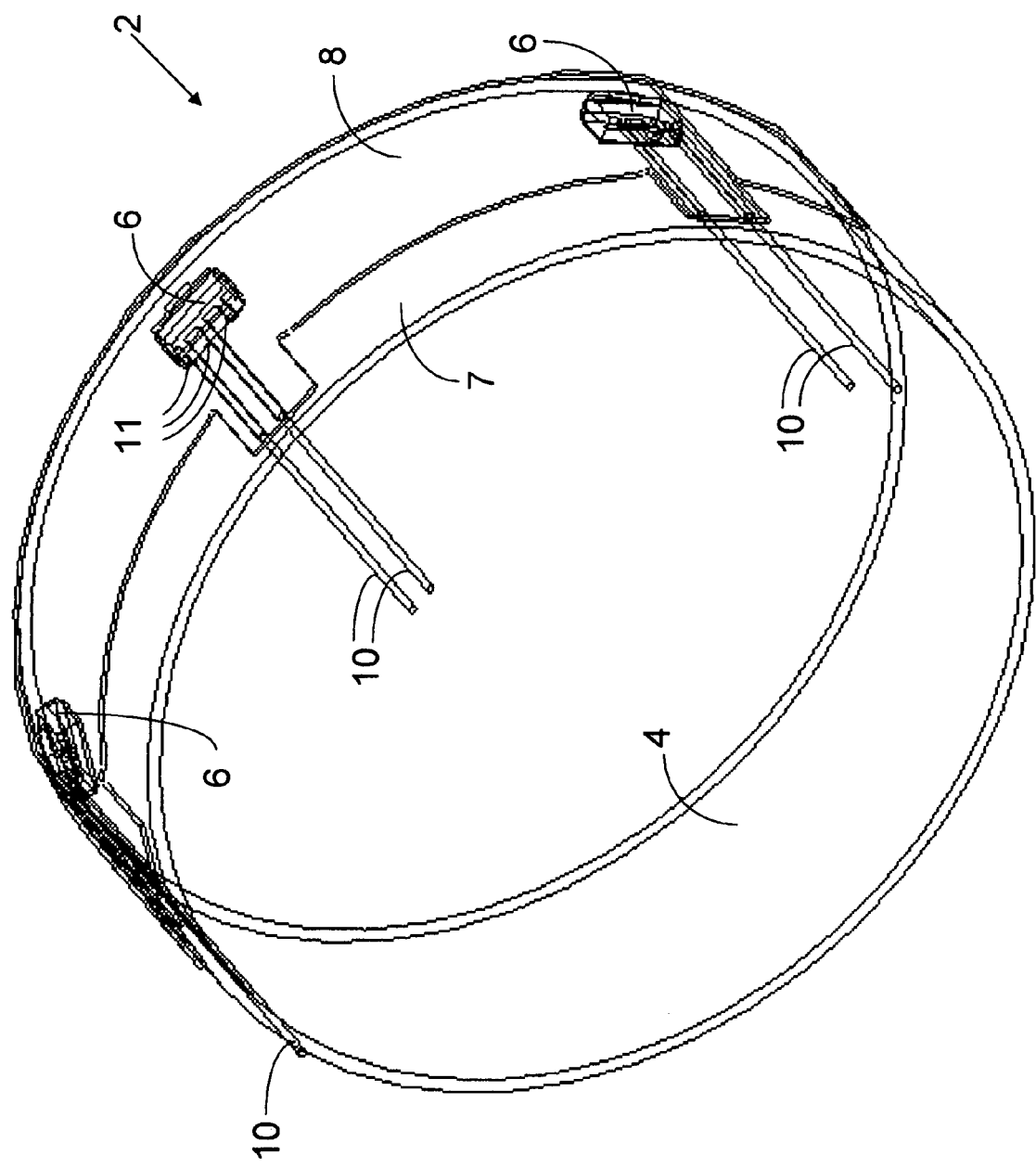
FIG. 1 shows a Hall-Effect sensor assembly according to a first embodiment of the invention.

FIG. 1 shows a Hall-Effect sensor assembly 2 according to a first embodiment of the invention. The sensor assembly 2 comprises a generally tubular substrate 4 and a plurality of Hall-Effect sensors 6 arranged along a tubular surface 7 of the tubular substrate 4. The tubular substrate 4 preferably comprises a high dielectric material with a high spring constant, such as a glass epoxy composite. One particularly useful material for the tubular substrate 4 comprises glass roving e-glass comprising six ends of PPG 1062 at 80 degrees and two end of PPG 1080 at zero degrees, set in 610 epoxy/anhydride resin/curative.

The Hall-Effect sensors 6 preferably protrude through corresponding apertures through the tubular substrate 4. In this embodiment, a wiring bus comprising a flexible printed wiring board (PWB) 8 mounts on the tubular substrate 4 and connects the Hall-Effect sensors 6 to wiring leads 10. The PWB 8 preferably comprises a flexible polyimide film, such as Kapton. The Hall-Effect sensors 6 have surface mount connection pads 11 that connect to the PWB 8. The Hall-Effect sensors 6 and wiring leads 10 may connect to the outside surface of the PWB 8 as shown or alternatively they may connect to the inside surface of the PWB 8.

Figure 2:
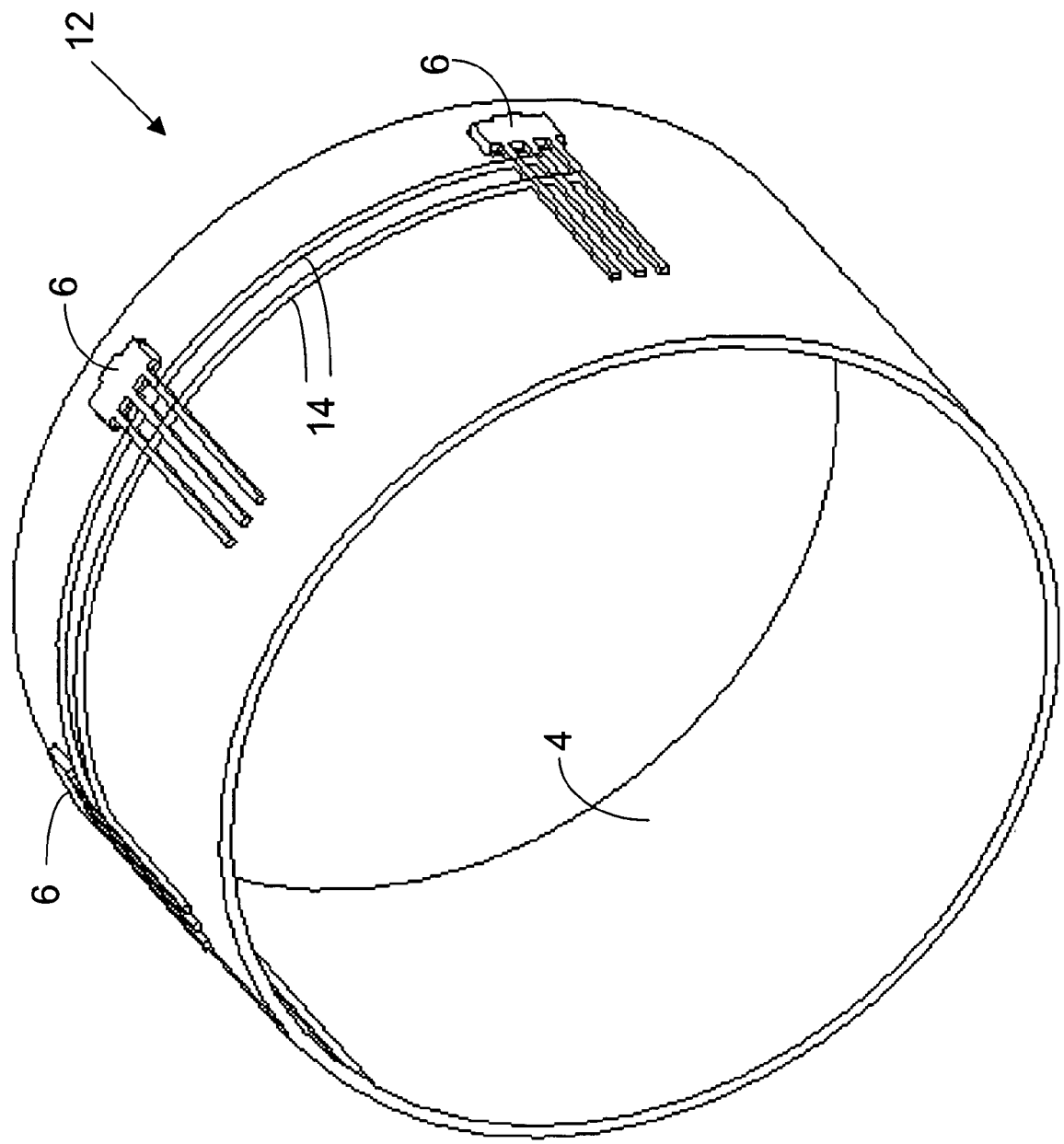
FIG. 2 shows a Hall-Effect sensor assembly according to a second embodiment of the invention.

FIG. 2 shows a Hall-Effect sensor assembly 12 according to a second embodiment of the invention. In this embodiment, the sensor assembly 12 comprises the same tubular substrate 4 described above and a plurality of Hall-Effect sensors 6. However, the wiring bus comprises a plurality of wiring leads 14 that connect to the Hall-Effect sensors 6. The Hall-Effect sensors 6 have connection leads that connect to the wiring leads 14.

Figure 3:
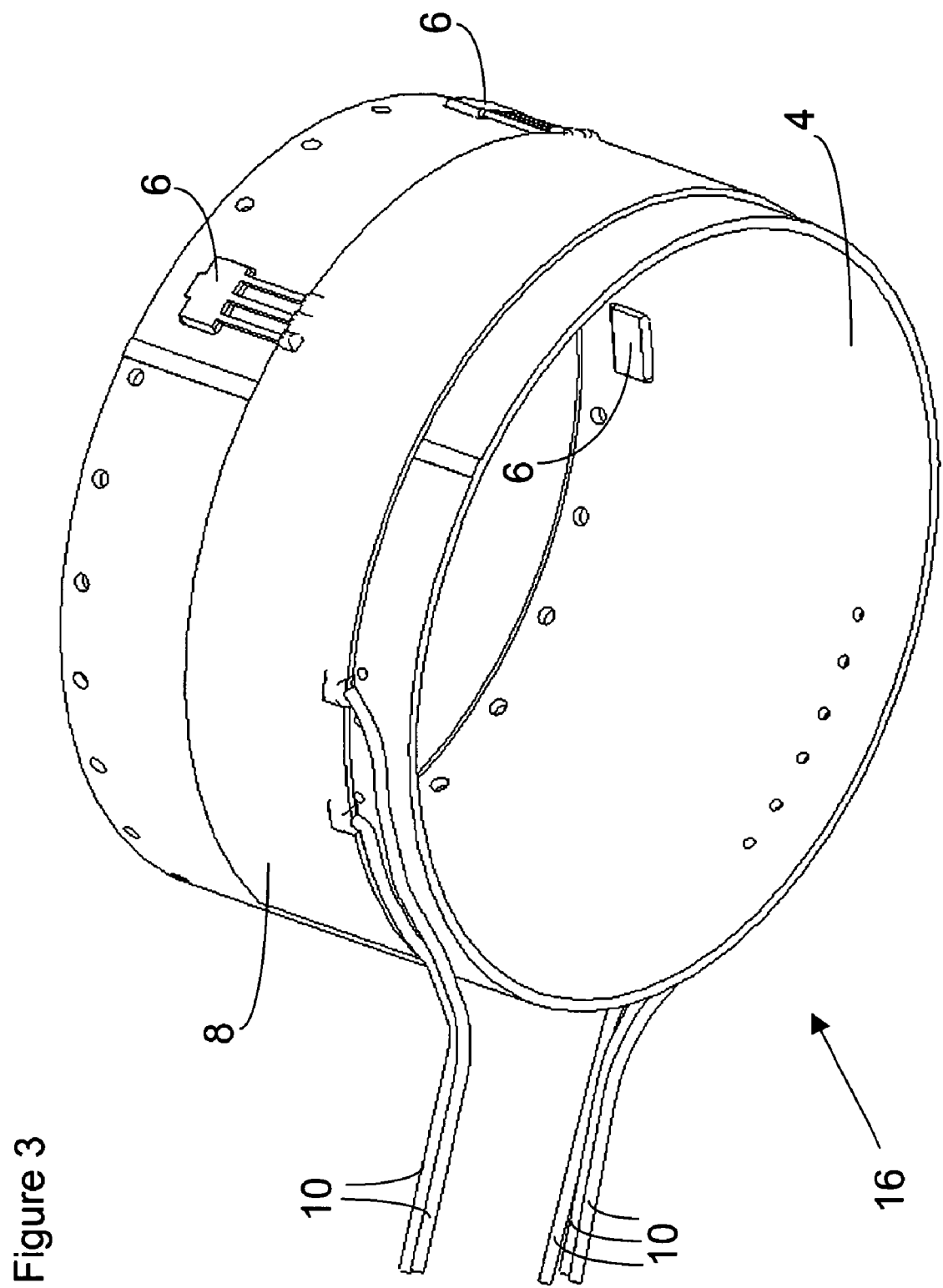
FIG. 3 shows a Hall-Effect sensor assembly according to a third embodiment of the invention.

FIG. 3 shows a Hall-Effect sensor assembly 16 according to a third embodiment of the invention. In this embodiment, the sensor assembly 16 comprises the same tubular substrate 4 described above and a plurality of Hall-Effect sensors 6. Just as described for the first embodiment, the wiring bus comprises PWB 8 that mounts on the tubular substrate 4 and connects the Hall-Effect sensors 6 to the wiring leads 10. However, the Hall-Effect sensors 6 have connecting leads that connect to the PWB 8. The Hall-Effect sensors 6 and wiring leads 10 may connect to the outside surface of the PWB 8 as shown or alternatively they may connect to the inside surface of the PWB 8.

Other embodiments of the invention shall be apparent to those skilled in the art. For instance, the tubular substrate 4 itself may comprise a wiring bus, such as by being fabricated as a PWB and formed into a tubular substrate. In this case, no separate PWB 8 is needed.

Figure 4:
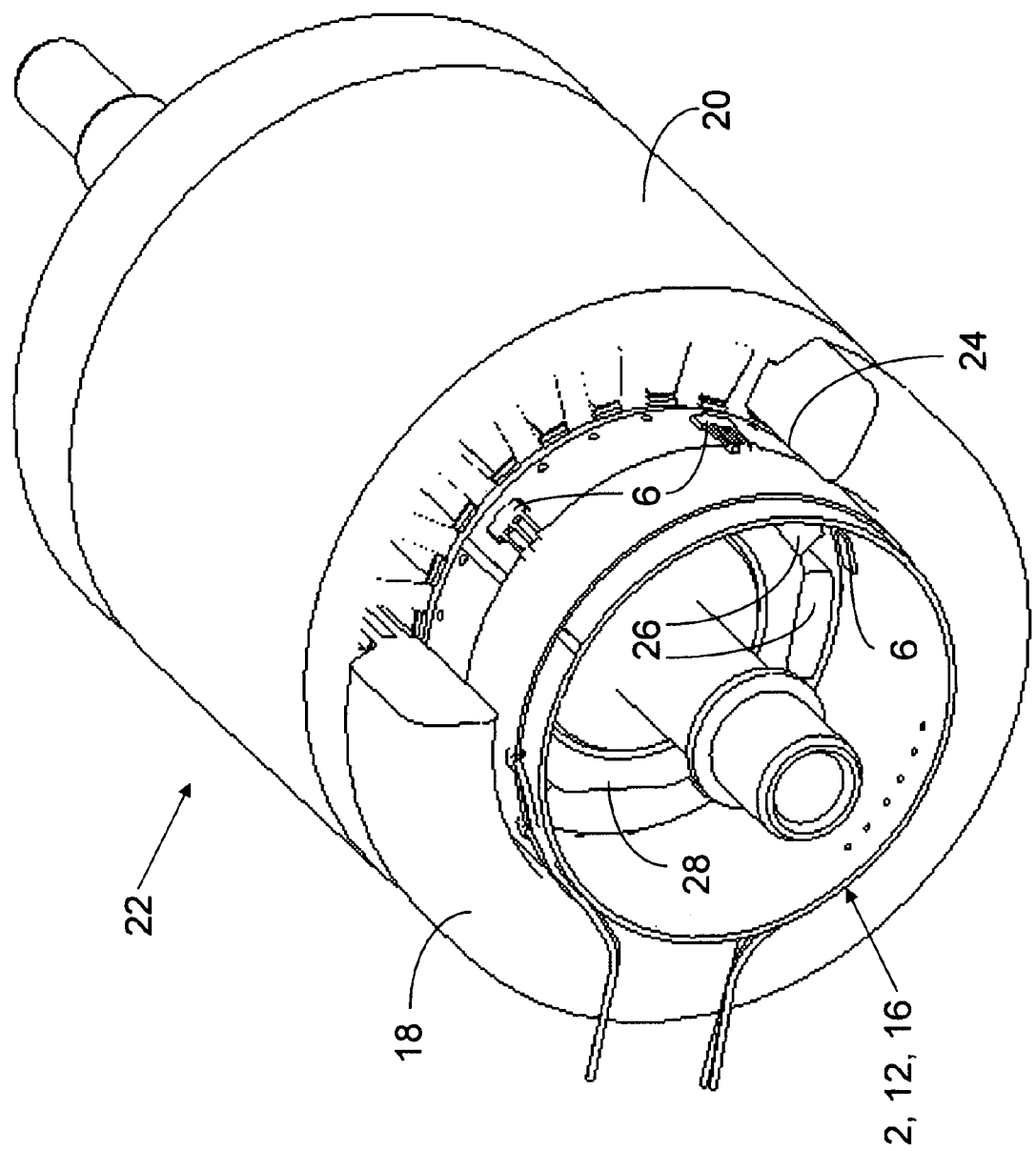
FIG. 4 shows a rotating electric machine with the Hall-Effect sensor assembly according to the invention that is installed inside the wound stator end turns of the rotating electric machine.

FIG. 4 shows a selected one of the Hall-Effect sensor assemblies 2, 12, 16 installed inside the end turns 18 of a wound stator assembly 20 for a rotating electric machine 22. The selected one of the Hall-Effect sensor assemblies 2, 12, 16 has an outer diameter sized to slidingly fit within the inner diameter of the wound stator end turns 18 as represented by inner surface 24. It is preferably held in place with clips or a high-temperature epoxy (not shown). So mounted, the Hall-Effect sensors 6 respond directly to the magnetic fields of main rotor magnets 26 for a permanent magnet rotor assembly 28 in the machine 22.

Described above are several embodiments of a Hall-Effect sensor assembly for a rotating electric machine comprising a thin, removable tubular substrate with Hall-Effect sensors and associated connection wiring mounted on it that slips underneath the wound stator end turns of the stator for the rotating electric machine to make the assembly easily removable for installation and repair. It should be understood that this embodiment is only an illustrative implementation of the invention, that the various parts and arrangement thereof may be changed or substituted, and that the invention is only limited by the scope of the attached claims.

What is claimed is:

1. A removable Hall-Effect sensor system for a rotating electric machine, comprising:

a thin tubular substrate to slidingly fit within an inner tubular surface of wound stator end turns for a stator in the rotating electric machine; and a plurality of Hall-Effect sensors mounted along an outer tubular surface of the tubular substrate for detecting magnetic fields of main rotor magnets for a rotor in the rotating electric machine to ascertain rotor position.

2. The sensor system of claim 1, wherein the Hall-Effect sensors are attached to the tubular substrate.

3. The sensor system of claim 1, wherein the Hall-Effect sensors protrude through apertures in the outer tubular surface of the tubular substrate.

4. The sensor system of claim 1, wherein the Hall-Effect sensors are connected to a wiring bus that is attached to the tubular substrate.

5. The sensor system of claim 4, wherein the wiring bus comprises a plurality of lead wires that are attached to the tubular substrate.

6. The sensor system of claim 5, wherein the Hall-Effect sensors have connection leads.

7. The sensor system of claim 4, wherein the wiring bus comprises a flexible printed wiring board that is attached to the tubular substrate.

8. The sensor system of claim 7, wherein the Hall-Effect sensors have surface mount connection pads.

9. The sensor system of claim 7, wherein the Hall-Effect sensors have connection leads.

10. The sensor system of claim 1, wherein the tubular substrate comprises a tubular printed wiring bus that connects to the Hall-Effect sensors.

11. A removable Hall-Effect sensor system for a rotating electric machine, comprising:
a thin tubular substrate to slidingly fit within an inner tubular surface of wound stator end turns for a stator in the rotating electric machine; and
a plurality of Hall-Effect sensors for detecting magnetic fields of main rotor magnets for a rotor in the rotating electric machine to ascertain rotor position mounted along an outer tubular surface of the tubular substrate; wherein the plurality of Hall-Effect sensors protrude through the tubular substrate and connect to a wiring bus that comprises a plurality of lead wires that are attached to the tubular substrate.

12. The sensor system of claim 11, wherein the Hall-Effect sensors have connection leads.

13. A removable Hall-Effect sensor system for a rotating electric machine, comprising:
a thin tubular substrate to slidingly fit within an inner tubular surface of wound stator end turns for a stator in the rotating electric machine; and
a plurality of Hall-Effect sensors for detecting magnetic fields of main rotor magnets for a rotor in the rotating electric machine to ascertain rotor position mounted along an outer tubular surface of the tubular substrate; wherein the plurality of Hall-Effect sensors protrude through the tubular substrate and connect to a wiring bus that comprises a flexible printed wiring board that is attached to the tubular substrate.

14. The sensor system of claim 13, wherein the Hall-Effect sensors have surface mount connection pads.

15. The sensor system of claim 13, wherein the Hall-Effect sensors have connection leads.

* * * * *